United States Patent [19]

Watanabe et al.

[11] Patent Number: 4,610,124
[45] Date of Patent: Sep. 9, 1986

[54] METHOD OF BUNDLING ELONGATE ARTICLES

[75] Inventors: Kozo Watanabe; Masashi Kawada, both of Kurobe, Japan

[73] Assignee: Yoshida Kogyo K. K., Tokyo, Japan

[21] Appl. No.: 639,319

[22] Filed: Aug. 10, 1984

[30] Foreign Application Priority Data

Aug. 11, 1983 [JP] Japan ................................ 58-147245

[51] Int. Cl.⁴ ............................................ B65B 13/32
[52] U.S. Cl. ........................................ 53/399; 53/442; 53/452; 53/466
[58] Field of Search ................. 53/399, 557, 582, 586, 53/590, DIG. 2, 442, 463, 466, 452; 100/33 PB; 156/468

[56] References Cited

U.S. PATENT DOCUMENTS

| | | | |
|---|---|---|---|
| 2,324,745 | 7/1943 | Weber | 53/399 |
| 2,982,063 | 5/1961 | Coleman et al. | 53/399 |
| 3,466,847 | 9/1969 | Farkas | 53/557 |
| 3,621,588 | 11/1971 | Grocke | 53/557 |
| 3,950,920 | 4/1976 | Thomsen et al. | 53/236 |
| 3,956,046 | 5/1976 | Tsuchiya et al. | 53/DIG. 2 |

FOREIGN PATENT DOCUMENTS 738958  6/1980  U.S.S.R. ................... 53/DIG. 2

Primary Examiner—John Sipos
Assistant Examiner—Donald R. Studebaker
Attorney, Agent, or Firm—Hill, Van Santen, Steadman & Simpson

[57] ABSTRACT

A number of elongate articles such as slide fasteners are placed on a length of a band web supplied on a bundle tray. Free and opposite ends of the length of the band web are gripped by a gripper mechanism with the length surrounding the elongate articles. End portions of the length are then ultrasonically fused together by an ultrasonic horn and an anvil. The opposite end of the length as it is gripped by the gripper mechanism is cut off by a cutter mechanism to form a band bundling the elongate articles. The elongate articles bundled by the band are then discharged by the bundle tray.

3 Claims, 11 Drawing Figures

METHOD OF BUNDLING ELONGATE ARTICLES

BACKGROUND OF THE INVENTION

1. Field of the Invention:

The present invention relates to a method of automatically bundling elongate articles such as slide fasteners, and more particularly to a method of bundling a plurality of elongate articles with a bundling band fed to and cut off in a bundling station.

2. Description of the Prior Art:

Finished slide fasteners discharged one by one from a slide fastener finishing machine are generally bundled manually by bands, and a number of bundles are packaged in a box. The conventional bundling bands are marked with printed items of information such as slide fastener types, dimensions, colors, and the number of slide fasteners bundled together. Therefore, there have been required many kinds of bundling bands, and it has been quite a complex task to keep an inventory of all necessary types of bundling bands at all times. The bundling bands have to be changed each time slide fasteners of different kinds, dimensions, and numbers are to be manufactured. The prior bundling practice has also been disadvantageous in that if the bundling bands were not changed or different bands were used, the information printed on the bands would fail to properly indicate the slide fasteners tied up thereby. Furthermore, the manual bundling operation is time-consuming and makes the bundles unsightly as the bands tend to be irregularly positioned.

SUMMARY OF THE INVENTION

It is an object of the present invention to provide a method of bundling elongate articles such as slide fasteners successively, automatically, and uniformly.

According to the present invention, a number of elongate articles such as slide fasteners are placed on and held by a length of a band web which has been supplied from a reel on a bundle tray. A free end and an opposite end of the length are gripped to cause the length to surround the elongate articles and then they are fused to each other. After the length of the band web has been cut off, the free end and the opposite end are released while a next free end of the band web is gripped, thus producing a band bundling the elongate articles. The elongate articles bundled by the band are then discharged by the bundle tray.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

Figure 1:
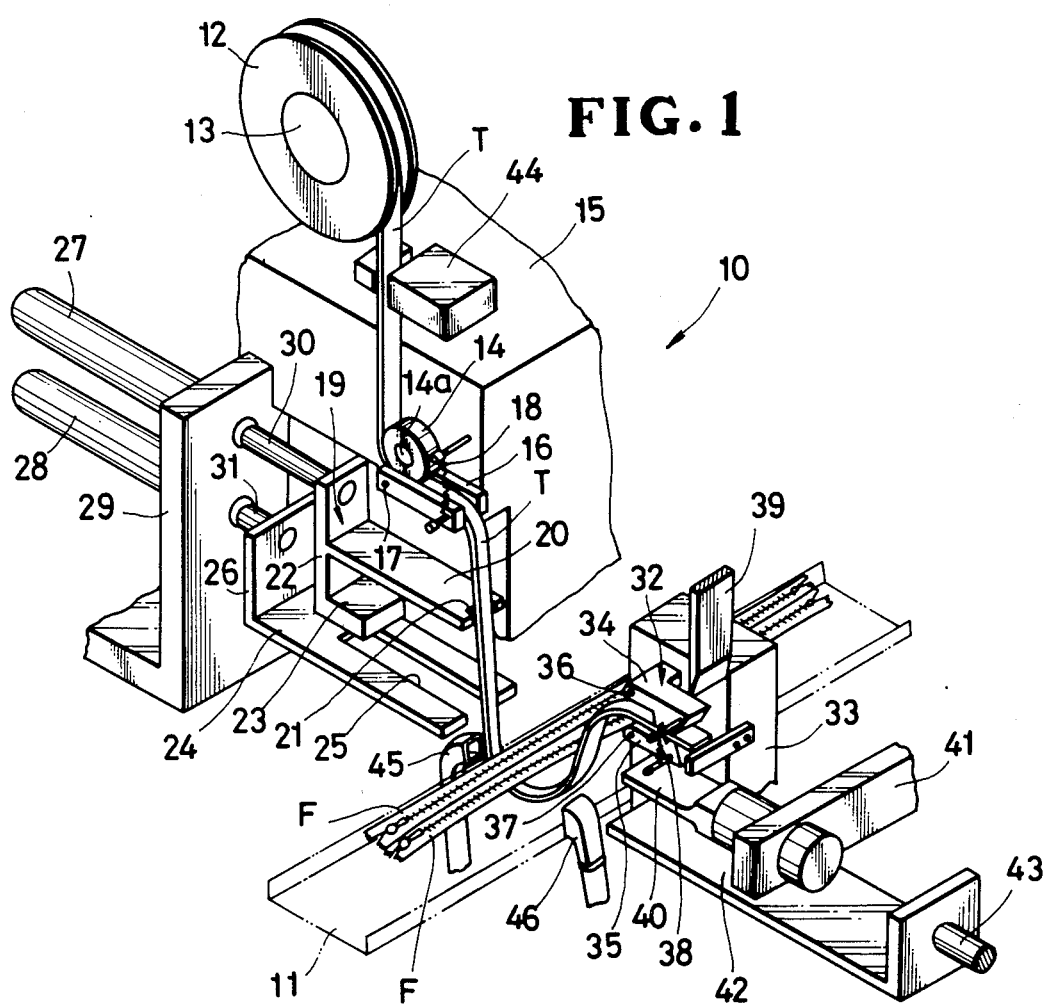
FIG. 1 is a perspective view of an apparatus for bundling slide fasteners according to the present invention.

FIG. 1 shows an apparatus for bundling a number of elongate pieces or articles F such as slide fasteners with a bundling band t (FIGS. 3A and 3B) of synthetic resin such as polyethylene or vinyl chloride, or laminated plastic of paper and synthetic resin.

The apparatus 10 has an elongate channel-shaped bundle tray 11 positioned substantially centrally in the apparatus 10 for receiving a bundle of elongate articles F. A reel 12 is rotatably mounted by a shaft 13 on a support (not shown) and positioned upwardly of the bundle tray 11 on one side thereof, the reel 12 supporting a roll of continuous band web T from which successive bands are cut off. A feed roller 14 is rotatably mounted by a shaft 14a on a base 15 for feeding the continuous band web T by a predetermined length in each cycle of operation of the bundling apparatus 10, the shaft 14a being coupled to a reversible motor (not shown). The feed roller 14 is positioned substantially directly below the reel 12. A band web guide 16 is vertically angularly movably mounted by a pin 17 on the base 15 below the feed roller 14. The band web guide 16 has a guide groove defined in an upper surface thereof and receives a lower portion of the feed roller 14 loosely fitted therein. The guide groove is slightly wider than the band web T for guiding the same therein. The band web guide 16 is normally biased by a spring 18 to move toward the feed roller 14 for coacting therewith in supplying the band web T by a controlled length each time.

A band web presser 19 is disposed below the feed roller 14 for laterally displacing the band web T as supplied from the feed roller 14. The band web presser 19 comprises a horizontal presser arm 20 having a positioning recess 21 defined in a distal end thereof and extending from a vertical base 22 and an anvil 23 positioned below the presser arm 20 and extending from the base 22 parallel to the presser arm 20. There is a horizontal forked band web holder 24 disposed below and extending parallel to the presser arm 20 from a vertical base 26, the band web holder 24 having a rectangular slot 25 defined therein and extending from a distal end thereof toward the base 26 but terminating short thereof. A pair of horizontal pneumatic cylinders 27, 28 is supported on a cylinder support 29 and has a pair of respective piston rods 30, 31 connected respectively to the vertical bases 22, 26 for retractably moving the presser arm 20, the anvil 23, and the band web holder 24 toward a position over the bundle tray 11.

A band web gripper 32 is positioned upwardly of the bundle tray 11 on an opposite side thereof in confronting relation to the presser arm 20. The band web gripper 32 includes a base 33 and a pair of gripping jaws 34, 35 pivotably mounted on the base 32 by a pair of pins 36, 37, respectively. The gripping jaws 34, 35 are normally biased toward each other by a spring 38 connected between the gripping jaws 34, 35 for gripping a free end of the band web T and a portion thereof that has been drawn by the band web presser arm 20, as is described below. A vertical cutter 39 is vertically movably disposed above a rear end of the band web gripper 32 remote from the pins 36, 37 for cutting off a portion $T_1$ (FIG. 2E) of the band web T which projects from the rear end of the band web gripper 32.

An ultrasonic horn 40 is positioned below the band web gripper 32 in confronting relation to the anvil 23 for fusing the band web T applied thereagainst by the anvil 23 which has been moved toward the ultrasonic horn 40. The ultrasonic horn 40 is supported at a rear end thereof by a support arm 41. A horizontal bundle pusher 42 is horizontally movably supported at a rear end thereof on a piston rod 43 of an air cylinder (not shown). The distal end of the horizontal bundle pusher 42 is retractably movable toward a position over the bundle tray 11.

A printer 44 is positioned between the reel 12 and the feed roller 14 for marking various pieces of information such as a slide fastener type and a lot number on the bundle web T at spaced intervals therealong.

A pair of hot air nozzles 45, 46 is disposed one on each side of the bundle tray 11 in mutually confronting relation for emitting hot air toward a finished bundle on the bundle tray 11. Where the bundle web T is made of a thermally shrinkable material, a bundle band will shrink around the slide fasteners F upon application of hot air for stably and tightly bundling the slide fasteners F.

Operation of the apparatus 10 of the foregoing construction is described with reference to FIGS. 2A through 2H.

Figure 2A:
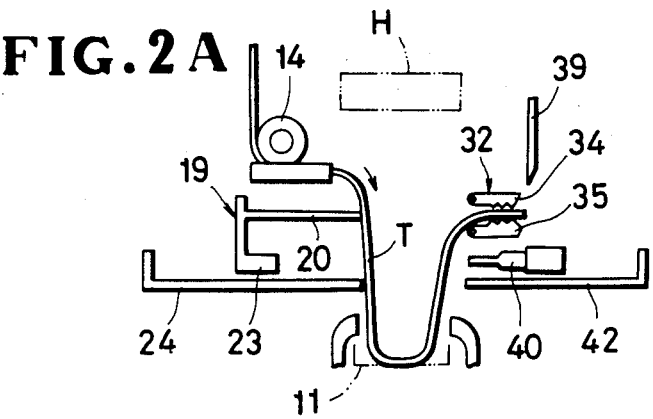
FIGS. 2A through 2H are schematic views showing progressive steps of bundling operation of the apparatus illustrated in FIG. 1.

As shown in FIG. 2A, a predetermined length of the band web T is unreeled by the feed roller 14 onto the bundle tray 11 substantially in the shape of a U with its free end gripped by the band web gripper 32. The presser arm 20, the anvil 23, the band web holder 24, and the bundle pusher 42 are in their retracted positions as shown. The feed roller holds the opposite end of said length of web when the roller is not turning.

Figure 2B:
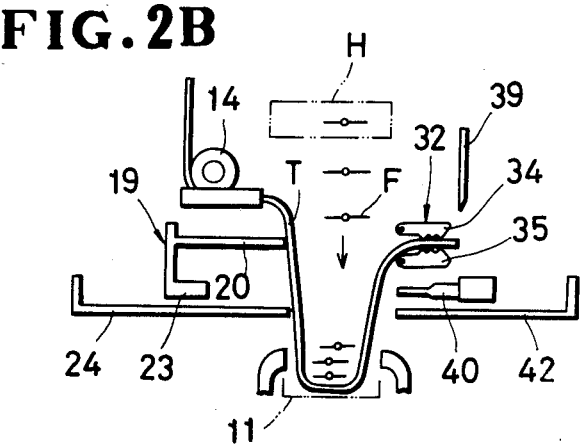

Finished slide fasteners F are discharged by gravity from a fastener discharger H coupled to a slide fastener finishing machine (not shown) and positioned over the bundle tray 11 so that the slide fasteners F are placed on the band web T on the bundle tray 11, as illustrated in FIG. 2B.

Figure 2C:
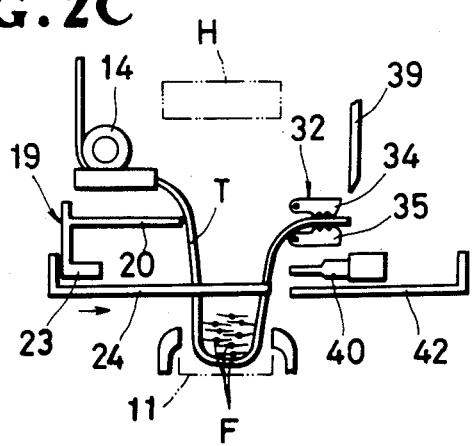

The band web holder 24 is moved forward with the band web T received in the slot 25 (FIG. 1) to the position over the bundle tray 11, in which the band web holder 24 holds down the slide fasteners F extending across the band web T, as shown in FIG. 2C.

Figure 2D:
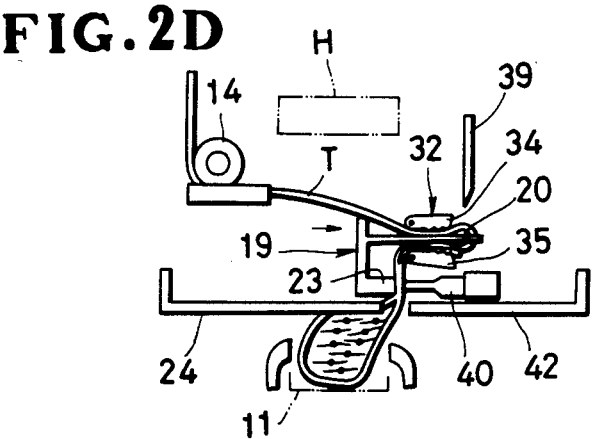

Then, the presser arm 20 and the anvil 23 are moved foward. The presser arm 20 presses the folded band web T forcibly between the gripping jaws 34, 35. At this time, the band web T is prevented by the band web holder 24 from being excessively pulled upwardly. The anvil 23 also presses portions of the band web T as it surrounds the slide fasteners F against the tip end of the ultrasonic horn 40. The ultsonic horn 40 is now energized to fuse the band web T held against the anvil 23 (FIG. 2D).

Figure 2E:
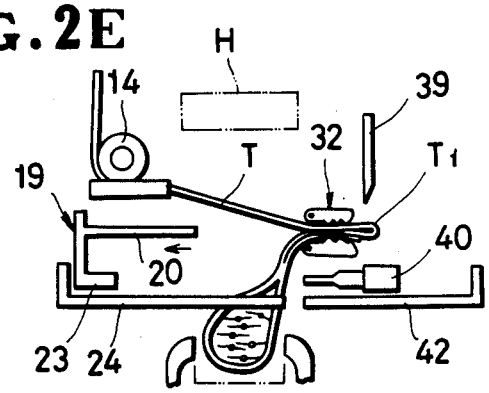

After the band web T has been ultrasonically fused, the presser arm 20 and the anvil 23 are retracted to their original position. The free end and folded portion of the band web T are left gripped between the gripping jaws 34, 35, with a length of the band web T between the free end and folded portion extending around the slide fasteners F, as shown in FIG. 2E.

Figure 2F:
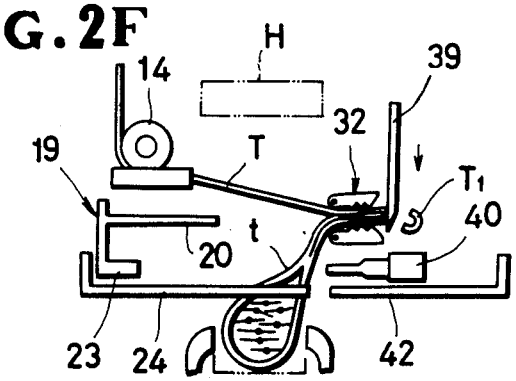

The cutter 39 is then lowered to cut off a portion T1 of the band web T which projects from the rear end of the band web gripper 32, whereupon the length of the band web T disposed around the slide fasteners F is cut off from the band web T into a bundling band t as shown in FIG. 2F.

Figure 2G:
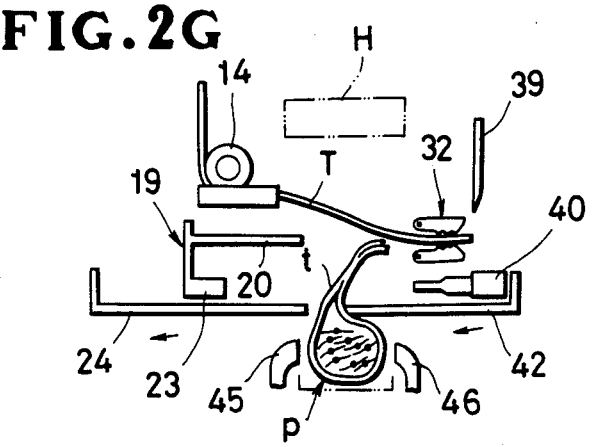

The band web holder 24 is retracted and at the same time the bundle pusher 42 is moved forward to push the bundling band t so that its end will be pulled off the band web gripper 32. At this time, an end of the band web T as supplied from the feed roller 14 remains gripped by the band web gripper 32. In case the band web T is made of a thermally shrinkable material, hot air is discharged from the hot air nozzles 45, 46 against the bundling band t to cause the latter to shrink tightly around the slide fasteners F, thereby producing a bundled article p, as illustrated in FIG. 2G.

Figure 2H:
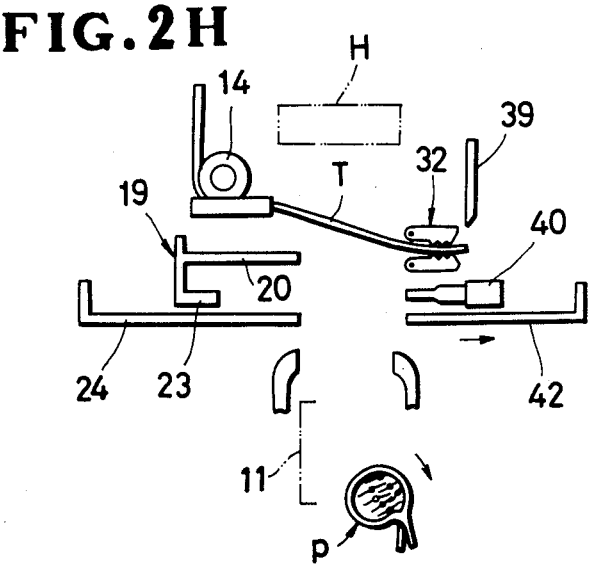

Finally the bundle tray 11 is tilted about one of its longitudinal edges to discharge the bundled article p as shown in FIG. 2H.

One cycle of bundling operation is now completed. The above cycle is then repeated to produce successive bundles of slide fasteners F. The printer 44 is actuated to mark the band web T with necessary information in each bundling cycle.

Figure 3A:
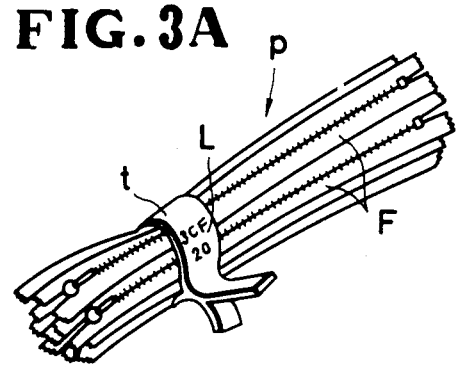
FIGS. 3A and 3B are perspective views of slide fasteners bundled by the apparatus 10 of FIG. 1.
Figure 3B:
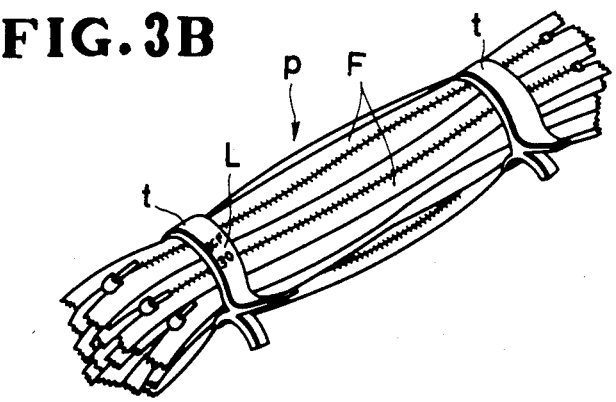

FIG. 3A shows a bundled article p thus produced from the apparatus 10. The bundled slide fasteners F are bundled by the band t bearing a printed piece of information L indicating a lot number. FIG. 3B illustrates another bundled article p in which the slide fasteners F are bundled by two bands t which can be supplied by two of the apparatus 10 which are disposed side by side.

Although various minor modifications may be suggested by those versed in the art, it should be understood that we wish to embody within the scope of the patent warranted hereon, all such embodiments as reasonably and properly come within the scope of our contribution to the art.

What is claimed is:

1. A method of bundling a number of elongate articles with a band, comprising the steps of:
    (a) feeding an untensioned length of a band web while gripping a free end thereof at a first fixed position, and thereafter holding the opposite end of the length of the web in a second fixed position against further feeding so that said length of the band web takes an untensioned gravity-formed upwardly open U-shape between said first and second fixed positions;
    (b) thereafter placing a number of elongate articles on said length one-at-a-time;
    (c) holding said elongate articles placed on said length;
    (d) gripping said free end and said opposite end of said fixed length together at said first fixed position to cause said length to surround said elongate articles, while simultaneously gripping the prospective free end of the next length of band web at said first fixed position;
    (e) fusing only the two end portions of said length to each other while gripping all of said three ends at said first fixed position;
    (f) cutting said length off said band web while gripping all of said three ends at said first fixed position;
    (g) releasing said free end and said opposite end while maintaining the gripping on the free end of said next length of band web at said first position, thus producing a banded bundle of said elongate articles; and
    (h) discharging said elongate articles bundled by said band.

2. A method according to claim 1, including the step of thermally shrinking said fused band tightly around said elongate articles before they are discharged.

3. A method according to claim 1, including the step of selectively printing data on said web.

* * * * *